United States Patent

[11] 3,620,339

| [72] | Inventor | Hermann Becking<br>Haferwey 26, Hamburg-Altona, Germany |
|------|----------|---------|
| [21] | Appl. No. | 850,930 |
| [22] | Filed | Aug. 18, 1969 |
| [45] | Patented | Nov. 16, 1971 |
| [32] | Priority | Mar. 25, 1969 |
| [33] | | Germany |
| [31] | | P 19 15 162.3 |

[54] ELECTROMAGNET CLUTCH OR BRAKE, TWISTED TORSION SPRING THEREFOR
16 Claims, 10 Drawing Figs.

[52] U.S. Cl. .................................................. 192/84 A,
192/84 C, 192/89 B, 192/106.1
[51] Int. Cl. ........................................................ F16d 27/06,
F16d 27/10
[50] Field of Search ........................................... 192/84, 84
A, 84 AA, 84 AB, 84 B, 89, 89 B, 84 C, 70.17,
70.18, 106.1, 106.2; 188/163, 1 B

[56] References Cited
UNITED STATES PATENTS
| 2,729,318 | 1/1956 | Harter | 192/84 C |
| 2,914,156 | 11/1959 | Harting | 192/84 B |
| 2,919,777 | 1/1960 | Walter | 192/84 C |

*Primary Examiner*—Allan D. Herrmann
*Attorney*—Beaman & Beaman

ABSTRACT: This invention resides in a novel construction of an annular armature-reaction flange assembly for an annular rotary electromagnet to be used as a friction clutch or as a brake. The armature-reaction flange assembly consists of an axially nonshiftable annular reaction flange carrying on its hub an annular armature disc in axially shiftable but nonrotatable manner both members being coaxially aligned with the electromagnet. Between the armature disc and the backing flange a torsion retraction and torque-transmitting spring is provided consisting of an annular planar disc secured alternately at angularly evenly spaced points to the armature disc and to the reaction flange. This planar disc is twisted in alternately opposite directions out of its radial plane in such a manner that the zones of greatest twist are disposed at its securing points. This annular torsion spring may also be subdivided into ring-sectors.

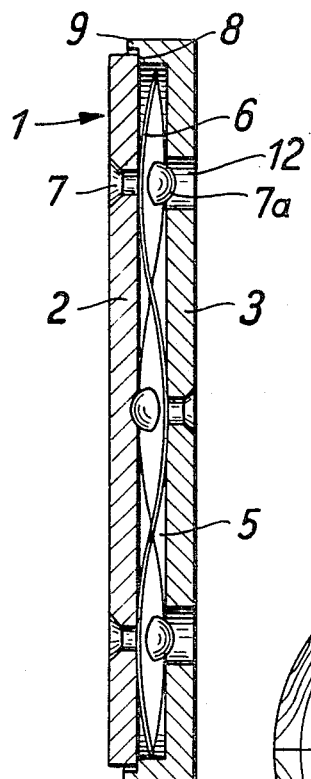
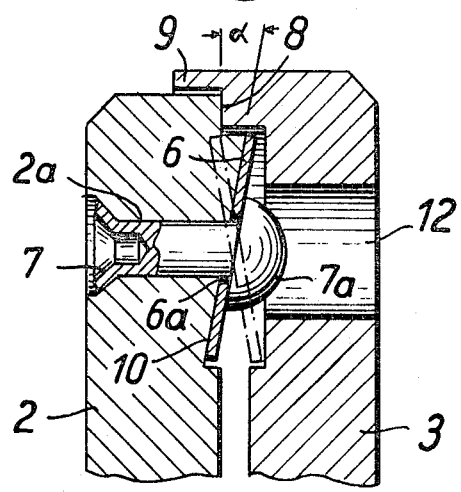
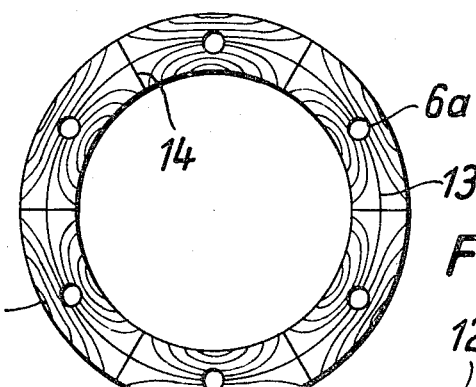
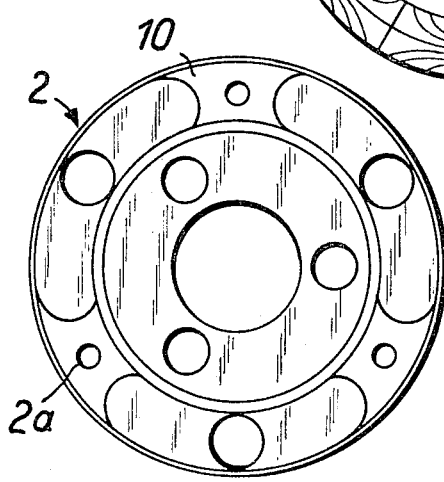
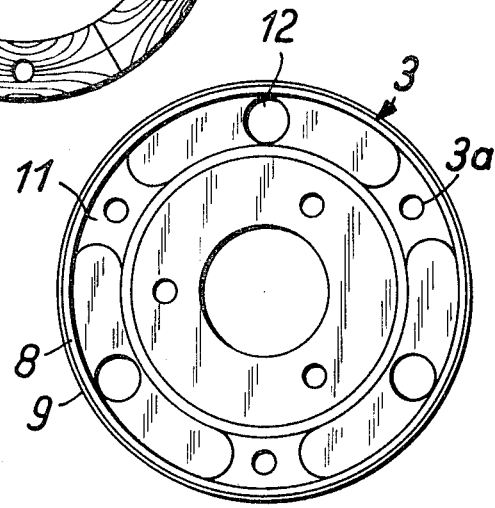

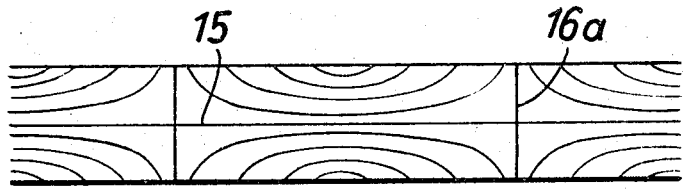
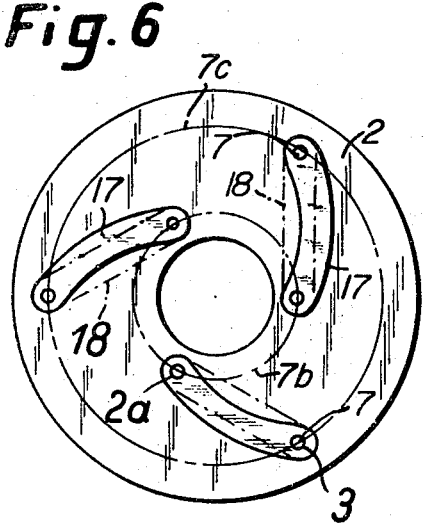
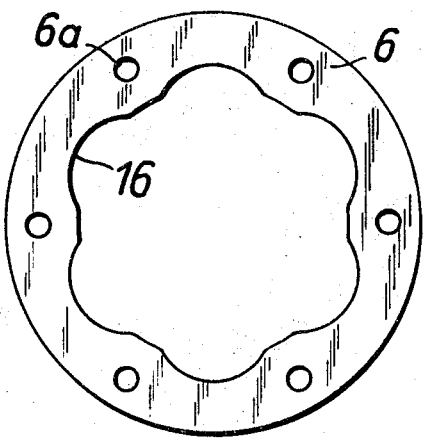
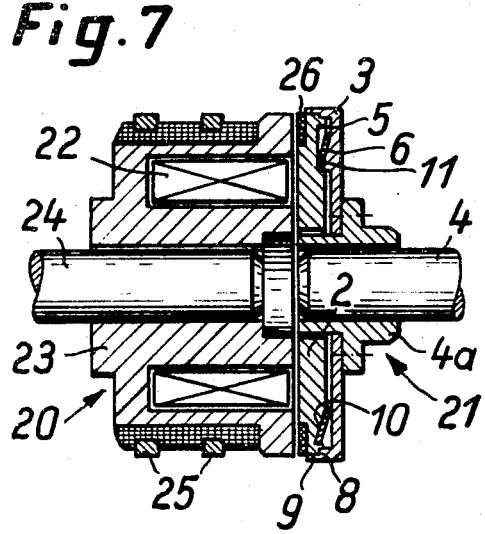
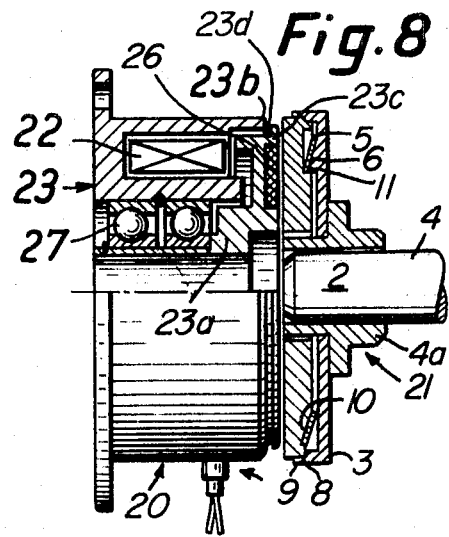

ELECTROMAGNET CLUTCH OR BRAKE, TWISTED TORSION SPRING THEREFOR

BACKGROUND OF THE INVENTION

1. Field of Invention

The subject matter of this invention may either be used as an electromagnetically operated friction clutch for the intermittent transmission of torque from a drive shaft to a coaxially aligned shaft or as an electromagnetically operated brake instantaneously stopping the rotation of a shaft. Such friction clutch or brake, respectively, may generally be employed in machine designs and is not limited to certain special fields of technique.

2. Description of the Prior Art

Electromagnetically operated clutches as well as brakes are known in which an axially shiftable armature disc is arranged between an axially nonshiftable annular electromagnet, forming the one clutch or brake part, and an axially nonshiftable reaction flange, forming the other clutch or brake part. The armature disc is axially shiftably but nonrotatably arranged on the reaction flange and is attracted by the electromagnet upon energization thereby causing the frictional engagement between the coupling or brake parts. In case of a rotary electromagnet body carrying slip-rings for feeding the electric energy the member carrying the magnet coil serves as the magnet member attracting the armature disc; in case of a stationary electromagnet body, requiring no slip-rings, a separate axially nonshiftably but rotatably supported pole ring serves as the magnet member attracting the armature disc.

In some electromagnetically operated clutches or brakes of this type no retraction spring is used for moving the armature disc away from the poles of the magnet after the magnet coil has been deenergized. In this case, however, a slow release of the armature disc from the poles of the magnet takes place causing a residual moment, and in case of a nonhorizontal assembly arrangement, an inadmissable heating and wear of the clutch due to the friction.

Therefore, spring elements acting in axial directions are provided retracting the armature disc a defined distance as small as possible from the poles of the body after its deenergization. For this purpose it is common practice to use leaf springs, diaphragms of steel or plastic material, or helical springs. Radially arranged leaf springs require a costly mounting and are additionally afflicted with an unfavorable mechanical stress. Diaphragms are disadvantageous since the tow clamping locations are unevenly loaded and, what is worse, is the the fact that, in case of diaphragms made of plastic material, the operating temperature must be kept low for reasons of deformations, and since, apart from this, assembly and operational difficulties may occur due to dimensional changes caused by the inherent tendency to deformations during operation.

If helical springs are used entrainment means in the form of teeth, keys, noses or bolts are required causing annoying play and noises upon actuation. This is the cause of wear and in most of the types lubrication is required due to the interengaging rubbing surfaces is required, so that these types require maintenance and, besides this, there is always the danger of operating trouble caused by wetting the friction surfaces with oil.

In a known electromagnetically operated friction clutch comprising an axially nonshiftable magnet body and an also axially nonshiftable reaction flange and an axially shiftable armature disc arranged therebetween, the armature disc and the reaction flange are alternately secured to an annular disc made of resilient material. This annular spring is sinusoidally corrugated in circumferential direction and is alternately connected under pretension to the armature disc and to the reaction flange at its vertexes. Due to this pretension a defined force is required already for axially moving the armature disc out of its position of rest. In fact, this means that the spring is subjected to bending stresses already, i.e. stresses in axial direction of the spring, when the armature is in its position of rest. Due to the axial movement of the armature disc additional bending and tensioning stresses are imposed on the spring.

Inherently an annular spring of this type has a strongly progressive characteristic which is additionally increased by the pretension caused in producing stresses in the axial direction of the spring so that the transmittable torque is relatively low.

This means that an annular spring of minimum thickness must be used, whereby extremely high pressures exerted by the fastener elements on the inside of the holes are encountered, and that the axial displacement of the armature disc must be kept at a minimum requiring a very accurate axial adjustment.

The high bearing pressures exerted on the walls of the mounting holes cause notchings on the rivets and thus widening of the holes in the spring which will finally lead to a breakdown of the annular spring. However, the progressivity, i.e. the slope of the characteristic curve is the deciding factor determining the maximum axial deflection which may possibly be employed.

The members of the known friction clutches and brakes tend to become easily misaligned relative to the axis of rotation causing a wobble movement between the reaction flange and the armature disc so that the clutch or brake will chatter.

An object of this invention is to improve an electromagnetically operated friction clutch, or brake respectively, comprising an axially nonshiftable magnet body, a likewise axially nonshiftable reaction flange and an axially shiftable armature disc arranged therebetween, wherein the armature disc and the reaction flange are alternately secured to an annular spring, in that the available deflection of the annular spring is increased and the slope of its characteristic curve is decreased.

Another object of this invention is to provide a clutch, or brake respectively, of the type described, in which the pressures exerted on the walls of the mounting holes of the annular spring are negligibly small.

Another object of this invention is to provide a clutch, or brake respectively, of the type described, in which the required attraction force for deflecting the annular spring is decreased, so as to improve the behavior of electrical switching.

Still another object of this invention is to provide a clutch, or brake respectively, of the type described, in which the centering between the reaction flange and the armature disc is improved and simultaneously providing a safety means in case of breakage of the annular spring or armature disc.

SUMMARY OF THE INVENTION

In an electromagnetic friction clutch, or brake respectively, the invention is realized by the provision of a rotary shaft; an annular housing of channel shape cross section made of magnetically conductive material and fixed to said shaft; a magnetic coil arranged within said channel-shaped housing connected to an electric energy source across slip-rings encompassing said housing; an axially nonshiftable reaction flange coaxially aligned relative to said housing; an annular armature disc disposed between said reaction flange and said housing coaxially aligned with and shiftable between said reaction flange and said housing; an annular friction disc provided between said armature disc and said housing secured to either one of said members; and annular torsion spring means disposed between and secured alternately to said armature disc and said reaction flange at angularly evenly spaced points and twisted in alternately opposite directions out of the radial plane, the zone of greatest twist being disposed at said securing points.

Thus the material stresses in the annular torsion spring representing the basic pretension are disposed in a different plane of stresses than the material stresses caused by the axial deflection of the spring.

The torsional tension of the spring causes a resulting force component due to the support at all of the mounting points tending to urge the annular armature with a defined force against the reaction flange, even if the armature is engaging the flange. Since the torsion of the annular spring remains constant, even when deflected axially, and the torsional stresses are disposed in a plane deviating from that of the bending stresses caused by the axial deflection only a constant value of torsional stresses $\tau$ is geometrically added to the bending stresses $\sigma$.

$$\sigma\text{red.} = \sqrt{\sigma^2 + 4\tau^2}$$

Since this value is smaller than that obtained in an arithmetical addition the result will be a characteristic curve of substantially lesser slope.

This lesser sloped characteristic curve allows the use of a greater cross-sectional area of the spring material, whereby the bearing pressure of the fastener means against the walls of the mounting holes is considerably decreased, the admissibly transferable torque is increased and the danger of buckling of the annular torsion spring is considerably decreased. At equal axial force the axial deflection may be increased, and vice versa the required attraction force is decreased at equal axial deflection, whereby the switching time of the clutch, or brake respectively, may be improved considerably.

The resistance moment of the annular torsion spring in radial direction may further be reduced in that its width towards the midzone between the securing points is progressively decreased.

According to the invention the annular torsion spring may be deformed prior to its assembly so as to retract the armature disc against an abutment of the reaction flange when assembled. In order to provide such an abutment and at the same time centering means for the annular armature disc relative to the reaction flange and safety means in case of breakage of the torsion spring against spattered parts the invention provides a recess formed in the radial surface of the reaction flange thereby providing a radial shoulder forming the abutment, and an axially extending circumferential centering flange projecting beyond the outer circumference of the armature disc.

The torsion spring may have the form of an annular integral disc and the mounting points may be formed by holes arranged on a concentric pitch circle disposed between the outer and inner circumference of the disc. Instead of making the torsion spring out of a single annular disc it is also possible to superpose a plurality of discs secured to each other and to the armature disc and reaction flange by fastener means extending through the mounting holes.

Instead of deforming the torsion spring prior to its assembly its is also possible to use a planar annular disc, or a plurality of superposed discs respectively, the deformation of which being forced in assembling the armature-torsion spring reaction flange unit by the provision of conical surface portions formed on the opposed radial surfaces of the armature disc and the reaction flange at the mounting points for the torsion spring extending alternately radially inclined in opposite direction including an angle between 4° and 10° with the radial plane.

According to the invention the torsion spring may also consist of a plurality of individual sections either in form of straight or arcuate leaves, each provided with mounting holes at their ends. In this case the mounting holes of the armature disc and of the reaction flange may be disposed on concentric circles of different diameters. In this construction the amount of scrap material is reduced considerably in comparison with the integral annular torsion spring.

The invention shall be described in detail in connection with the annexed drawings.

BRIEF DESCRIPTION OF THE DRAWINGS

FIG. 1 is a sectional view of one clutch embodiment showing a resiliently deformed annular torsion spring arranged between two planar radial surfaces;

FIG. 2 is a partial sectional view of another embodiment having obliquely extending radial surfaces provided at the opposed inner faces of the annular armature disc and the reaction flange serving to twist the torsion spring in its assembled state;

FIG. 3 is a front view of the torsion spring in which the height contour lines are drawn showing the alternately opposite twist of the spring;

FIG. 3a is a front view of the armature disc, in which the projecting conical surface portions for securing the annular torsion spring, shown in FIG. 3 are illustrated.

FIG. 3b is a front view of the reaction plate, similar to FIG. 3a, in which the projecting conical surface portions for securing the annular torsion spring shown in FIG. 3, are illustrated.

FIG. 4 is a straight torsion leaf spring;

FIG. 5 is an annular torsion spring having a decreased resistance moment between its mounting points;

FIG. 6 is a torsion spring arrangement of arcuate torsion spring sections;

FIG. 7 is an axial section view of one clutch embodiment including an integral magnet body; and FIG. 8 is an axial sectional view of another clutch embodiment including a magnet body composed of a rotary pole body and a stationary magnet body,

DESCRIPTION OF THE PREFERRED EMBODIMENTS

The clutch body 1 comprises an armature disc 2 and a reaction flange 3. The reaction flange 3 is axially non shiftably secured on a shaft 4 (see FIG. 7). According to the embodiment of the clutch shown in FIG. 1 the reaction flange 3 has a stepped recess 5 formed in its one face serving to accommodate an annular torsion spring 6. This annular torsion spring 6 consists of a planar annular disc of spring material and is alternately twisted normally to its radial plane in opposite directions and is alternately secured by rivets to the armature disc 2 and to the reaction flange at the points of greatest twist. The diameter of the armature disc 2 is larger than the smaller diameter of the stepped recess 5 in the reaction flange. The larger bore of the stepped recess 5 forms on the one hand a radial shoulder 8 against which the armature disc abuts and on the other hand an axially extending flange 9 projecting with a sliding fit over the outer circumference of the armature disc as shown in FIG. 2.

The twisted deformation of the annular torsion spring 6 may, instead of being prefabricated, also be obtained by using a planar annular disc of any cross-sectional shape which is alternately secured to conical surface portions 10 of the armature disc 2 and conical surface portions 11 of the reaction flange 3 which are inclined relative to the radial plane alternately in opposite directions, as shown in FIG. 2 the angle of inclination $\alpha$, FIG. 2, being between 4° and 10°. FIG. 2 also shows that the reaction flange 3 has an opening 12 formed therein allowing access to the head 7a of the rivets 7 during the riveting process. The connection with the reaction flange 3 is similar.

In order to clearly illustrate the twisted deformation of the annular torsion spring 6 the height contour lines are shown in FIG. 3 in a similar manner as in maps. The height contour line 13 extending concentrically to and in the middle between the inner and outer circle intersecting the centers of the mounting holes 6a and forming the pitch circle thereof as well as the height contour lines 14 extending radially in the middle between the mounting holes 6a are disposed in the not twisted plane of the annular torsion spring the annular surface portions along the height contour line 13 or pitch circle are alternately convex and concave, wherein always a convex portion radially outwardly of the height contour line 13 coincides with a concave portion radially inwardly of the height contour line 13. The concave and convex portions alternate in circumferential direction. As shown in FIG. 4 the circular height contour line 13 of the annular torsion spring 6 corresponds to a straight spring axis of a straight torsion leaf spring, while the radially extending height contour line 14 of the annular torsion spring 6 corresponds to the height contour line 16a of the straight torsion leaf spring extending normally to the height contour line 15.

According to FIG. 5 the radial dimension of the annular torsion spring 6 is decreased progressively along its inner circumference between the mounting points, thereby decreasing the resistance moment. To this end the torsion spring 6 shown in FIG. 5 has arcuate recesses 16 formed along its inner circumference so that the change of the radial dimension is substantially uniform.

The thickness of the annular torsion spring depends of the diameter of the clutch, or brake, respectively, and on the torque to be transferred. In case of a clutch disc diameter of approximately 20 mm. and a torque of 0.003 mkp. to be transferred the thickness of the annular torsion spring will be 0.03 mm.; in case of a clutch disc diameter of 200 mm. and a torque of 40 mkp. the thickness of the annular torsion spring may amount to 0.8-1 mm. However, in this latter case the spring is preferably composed of two to three layers in superposed arrangement interconnected by rivets, screws, or the like.

In order to better exploit the material by decreasing the scrap material the annular torsion spring 6 may, as shown in FIG. 6, be replaced by individual arcuate ring sectors 17, or by straight leaves 18 which are twistedly secured to the reaction flange 3 and to the annular armature disc 2 in the manner described above. In this case, however, the mounting holes 2a for the rivets 7 are disposed on two pitch circles 7b and 7c, the circle 7b of the armature disc 2 is of smaller diameter than the circle 7c defining the center of the mounting holes 3a in the reaction flange 3.

The armature 2 rests on the abutment shoulder 8 of the reaction flange 3 assuring that the armature occupies a defined position of rest with regard to the reaction flange, whereby wobbling movements of the armature are avoided. The integral axial flange 9 of the reaction flange 3 projects over the outer circumferential surface of the annular armature disc 2 thereby preventing foreign bodies and dirt from entering the spring chamber between the armature and the reaction flange. In addition it prevents eccentric displacement of the armature when overloaded or in case of breakage of the spring and forms a protection against negligent destruction, or overstressing of the annular torsion spring 6 respectively, and also against incorrect assembly. In addition it safeguards other machine elements against the ejection of the armature disc or broken pieces in case of a breakage of the torsion spring.

OPERATION OF THE ELECTROMAGNETICALLY OPERATED FRICTION CLUTCH, OR BRAKE RESPECTIVELY

The clutch comprises a driving part 20 generating the magnetic field and a driven part 21 influenced by the magnetic field. The driven part 20 includes a magnet coil 22 and a magnetic conductive body 23 conducting the magnetic flux. The magnet body member 23 is axially nonshiftably mounted on the shaft 24. The driven part 21 influenced by the magnetic field comprises the annular armature disc 2, the annular torsion spring 6, the reaction flange 3, and the hub 4a secured to the reaction flange 3 and arranged therewith on the shaft 4 in an axially nonshiftable manner.

Since the magnet body 23 rotates with the shaft 24 the energizing current must be fed by means of slip rings 25. The energized magnet coil 22 generates a magnetic field acting upon the armature disc 2 to be attracted against the magnet housing 23 and, due to the great magnetic attraction pressure and the thereby caused frictional engagement, torque may be transmitted from the magnet housing 23 to the armature disc 2. For increasing the frictional engagement the driven clutch part 21 shown in FIG. 7 carries an annular friction disc 26 embedded therein on the disc 2 at the side facing away from the reaction flange 3 and cooperating with the opposed radial surface of the magnet body 23. Within the driven part 21 the torque is transmitted by the torsion spring 6 from the armature disc 2 to the reaction flange 3.

When the energizing current for the magnet coil 22 is switched off no magnetic field acts anymore on the armature disc 2. The spring 6 tensioned by the attraction of the armature disc 2 retracts the latter from the friction surface of the magnet body 23 axially in the direction toward the reaction flange against the abutment shoulder 8 of the reaction flange, securely holding it in this position.

During the movement of the armature disc 2 toward the driving part 20 and away therefrom the armature disc is guided by the axial flange 9 of the reaction flange whereby axial misalignment of the armature disc is impossible, and whereby the space between the armature disc 2 and the reaction flange 3 is exteriorly protected so that on the one hand no foreign matter can enter this space, and avoiding on the other hand that the armature, fractions of the armature or fractions of the annular torsion spring may be ejected if a failure should occur.

In FIG. 8 a driving part 20 generating the magnetic field is shown, according to which the magnet body 23 is subdivided into an inner member 23a and an outer member 23b. The stationary member 23 carries the magnet coil 22 and supports the rotary member 23a on a double antifriction bearing 27. The inner rotary member 23a has a radially outwardly extending flange 23c defining a narrow gap 23d with the end face of the stationary member 23b. The magnetic flux is transmitted across radial air gaps from the stationary member 23b to the rotary member 23a. In such an arrangement no slip-rings are required for feeding the electric energy to the magnet coil 22. In the illustrated exemplified embodiment the friction disc 26 is not embedded in the armature disc 2 but is arranged on the rotary member 23a of the magnet body 23.

The embodiments shown in the drawings and described above are characterized by a simple sturdy construction allowing assembly in a very simple manner and are adapted for extremely rough operating conditions. If the magnet body 23 or the reaction flange 3 are arranged in such a manner that they are not allowed to rotate about the shafts 24, or 4 respectively, then the arrangement acts as a brake.

What I claim is:

1. In an electromagnetic friction clutch, or brake respectively: a rotary shaft; an annular housing of channel-shaped cross section made of magnetically conductive material and fixed to said shaft; a magnet coil arranged within said channel-shaped housing connected to an electric energy source across slip-rings encompassing said housing; an axially nonshiftable reaction flange coaxially aligned relative to said housing; an annular armature disc disposed between said reaction flange and said housing coaxially aligned with and shiftable between said reaction flange and said housing; an annular friction disc provided between said armature disc and said housing secured to either one of said members; and annular torsion spring means disposed between and secured alternately to said armature disc and said reaction flange at angularly evenly spaced points and twisted in alternately opposite directions out of the radial plane, the zones of greatest twist being disposed at said securing points.

2. A friction clutch or brake according to claim 1, wherein the width of said torsion spring means is progressively decreasing towards the midzone between said securing points thereby varying the moment of resistance in the radial direction.

3. A friction clutch or brake according to claim 1, wherein said torsion spring means is deformed prior to its assembly so as to retract said armature disc against an abutment of said reaction flange when assembled.

4. A friction clutch or brake according to claim 3, wherein a recess is formed in the radial surface of said reaction flange thereby providing a radial shoulder forming said abutment and an axially extending circumferential centering flange projecting beyond the outer circumferential surface of said armature disc.

5. A friction clutch or brake according to claim 1, wherein said torsion spring means consists of an annular integral disc said mounting points being formed by holes provided on a concentric pitch circle disposed between the outer and inner circumference of said disc.

6. A friction clutch or brake according to claim 1, wherein the inner opposed radial surfaces of said armature disc and said reaction flange have conical surface portions formed at the mounting points for said torsion spring means extending alternately radially inclined in opposite directions including an angle between 4° and 10° with the radial plane, thereby twisting said torsion spring means when mounting the same.

7. In an electromagnetic friction clutch, or brake respectively: a rotary shaft; an annular housing of channel-shaped cross section made of magnetically conductive material and fixed to said shaft; a magnet coil arranged within said channel-shaped housing connected to an electric energy source across slip-rings encompassing said housing; an axially nonshiftable reaction flange coaxially aligned relative to said housing; an annular armature disc disposed between said reaction flange and said housing coaxially aligned with and shiftable between said reaction flange and said housing; an annular friction disc provided between said armature disc and said housing secured to either one of said members; and torsion spring means disposed between and secured alternately to said armature disc and said reaction flange at angularly evenly spaced points and twisted in alternately opposite directions out of the radial plane, the zones of greatest twist being disposed at said securing points, said torsion spring means comprising a plurality of individual sections having mounting holes disposed on concentric circles of different diameters.

8. A friction clutch or brake according to claim 7, wherein said torsion spring sections are formed by ring sectors.

9. In an electromagnetic friction clutch, or brake respectively: a rotary shaft; an annular housing composed of an inner and an outer member made of magnetically conductive material, said inner member being fixed to said shaft while said outer member is journaled on said inner member and fixed to a stationary member; a magnetic coil arranged within an axially extending annular recess of said outer housing member, said inner housing member having a radially outwardly extending flange separated from said outer member by an airgap; an axially nonshiftable reaction flange coaxially aligned relative to said housing; an annular armature disc disposed between said reaction flange and the flange of said inner housing member coaxially aligned with and shiftable between said reaction flange and said inner housing member; and torsion spring means disposed between and secured alternately to said armature disc and said reaction flange at angularly evenly spaced points and twisted in alternately opposite directions out of the radial plane, the zones of greatest twist being disposed at said securing points, said torsion spring means comprising a plurality of individual sections having mounting holes disposed on concentric circles of different diameters.

10. A friction clutch or brake according to claim 9, wherein said torsion spring sections are formed by ring sectors.

11. In an electromagnetic friction clutch, or brake respectively: a rotary shaft; an annular housing composed of an inner and an outer member made of magnetically conductive material, said inner member being fixed to said shaft while said outer member is journaled on said inner member and fixed to a stationary member; a magnetic coil arranged within an axially extending annular recess of said outer housing member, said inner housing member having radially outwardly extending flange separated from said outer member by an airgap; an axially nonshiftable reaction flange coaxially aligned relative to said housing; an annular armature disc disposed between said reaction flange and the flange of said inner housing member coaxially aligned with and shiftable between said reaction flange and said inner housing member; and annular torsion spring means disposed between and secured alternately to said armature disc and said reaction flange at angularly evenly spaced points and twisted in alternately opposite directions out of the radial plane, the zones of greatest twist being disposed at said securing points.

12. A friction clutch or brake according to claim 11, wherein the width of said torsion spring means is progressively decreasing towards the midzone between said securing points thereby varying the moment of resistance in the radial direction.

13. A friction clutch or brake according to claim 12, wherein said torsion spring means is deformed prior to its assembly so as to retract said armature disc against an abutment of said reaction flange when assembled.

14. A friction clutch or brake according to claim 13, wherein a recess is formed in the radial surface of said reaction flange thereby providing a radial shoulder forming said abutment and an axially extending circumferential centering flange projecting beyond the outer circumferential surface of said armature disc.

15. A friction clutch or brake according to claim 11, wherein said torsion spring means consists of an annular integral disc, said mounting points being formed by holes provided on a concentric pitch circle disposed between the outer and inner circumference of said disc.

16. A friction clutch or brake according to claim 11, wherein the inner opposed radial surfaces of said armature disc and said reaction flange have conical surface portions formed at the mounting points for said torsion spring means extending alternately radially inclined in opposite directions including an angle between 4° and 10° with the radial plane, thereby twisting said torsion spring means when mounting the same.

* * * * *